(12) United States Patent
Meek et al.

(10) Patent No.: US 7,092,969 B2
(45) Date of Patent: Aug. 15, 2006

(54) MANAGEMENT OF SOURCE AND DERIVATIVE IMAGE DATA

(75) Inventors: Brian Gunnar Meek, Soquel, CA (US); George W. Coleman, Loganville, GA (US)

(73) Assignee: Interwoven, Inc., Sunnyvale, CA (US)

( * ) Notice: Subject to any disclaimer, the term of this patent is extended or adjusted under 35 U.S.C. 154(b) by 87 days.

(21) Appl. No.: 10/438,798

(22) Filed: May 15, 2003

(65) Prior Publication Data

US 2004/0015479 A1 Jan. 22, 2004

Related U.S. Application Data

(63) Continuation of application No. 09/651,594, filed on Aug. 30, 2000, now abandoned.

(60) Provisional application No. 60/151,508, filed on Aug. 30, 1999.

(51) Int. Cl.
*G06F 17/30* (2006.01)

(52) U.S. Cl. .................. 707/104.1; 707/10; 707/102; 707/203; 707/204; 707/205; 382/141

(58) Field of Classification Search .................. 707/5, 707/201, 202, 10, 102, 404, 203, 204, 205; 382/141

See application file for complete search history.

(56) References Cited

U.S. PATENT DOCUMENTS

| | | | | |
|---|---|---|---|---|
| 5,710,917 A | * | 1/1998 | Musa et al. ............. | 707/201 |
| 5,832,521 A | * | 11/1998 | Klots et al. ............. | 707/203 |
| 5,974,168 A | * | 10/1999 | Rushmeier et al. ....... | 382/141 |
| 5,987,456 A | * | 11/1999 | Ravela et al. ........... | 707/5 |
| 6,123,258 A | * | 9/2000 | Iida ..................... | 235/375 |

FOREIGN PATENT DOCUMENTS

| | | |
|---|---|---|
| EP | 0 938 227 | 8/1999 |
| JP | 07 057115 | 3/1995 |

OTHER PUBLICATIONS

Kawashima, et al. "Versioning Model of Image Objects for easy Development of Image Database Applications" Database Inspec ONLINE! Inspec No. AN5430836, & Proc 7th Intl Workshop on database and Expert Systems Applications, Sep. 1997.

(Continued)

*Primary Examiner*—Thuy N. Pardo
(74) *Attorney, Agent, or Firm*—Michael A. Glenn; Glenn Patent Group

(57) ABSTRACT

A method and apparatus for managing source and derivative data is disclosed. Source data, typically image data, is centralized in a database and derivative data sets are formed from the source data. When it is desired to modify a derivative data, the source data can be accessed and modified to form a new derivative data set instead of modifying the already derived data set. In this way source data integrity is maintained. Derivative data sets are identified and tags are associated with new derivative images. The tag can be embedded in the derivative data or associated with the image as an attached element. The tag identifies information such as the server that generated the derivative image, the source image and any tasks or transformations that were applied to the source image to generate the derivative data. Users of source data can be given access to a central source data repository and access privileges can be assigned. In this way a number of users can access the source files and globally modify all derivative images by changes in the source file.

19 Claims, 11 Drawing Sheets

OTHER PUBLICATIONS

Aritsugi, M.et al., "Manipulation of Image Objects and their Versions under CORBA Envirionment", Database Inspec ONLINE! Inspec No. AN5710308 & Proc 8th Int. Workshop on Database and Exper Systems Applications p. 90 Sep. 1997.

Shimada, T., "Interactive Scaling Control Mechanism for World Wide Web Systems", Compuer Netweorks and ISDN Systems, North Holland Publishing, Amsterdam, NL. Sep. 1997.

* cited by examiner

MANAGEMENT OF SOURCE AND DERIVATIVE IMAGE DATA

CROSS REFERENCE TO RELATED APPLICATIONS

This application is a continuation of U.S. application Ser. No. 09/651,594, filed Aug. 30, 2000, now abandoned, which claims the benefit of U.S. Provisional Application No. 60/151,508, filed Aug. 30, 1999, each of which is incorporated herein by reference.

FIELD OF THE INVENTION

The invention relates generally to the management of source and derivative data and, more particularly, to methods and apparatuses for managing source and derivative image data for efficient use and manipulation within a computer network environment.

BACKGROUND

The Internet is the largest network of computers. Large corporations and educational institutions may have their own networks of computers, which may themselves be part of, or apart from, the Internet. Digital data, stored on one or more computers (called "Source Data"), may be accessed by one or more other computers and altered by such other computer(s) to generate "Derivative Data". Often times, the source data is typically modified by a computer other than the computer that is requesting the derivative data. The Derivative Data may be stored on one or more other computers, which may include all or some of the computers on which the Source Data were stored and all or some of the computers that altered the Source Data. When the Source Data is representative of an image, it is called Source Image Data and the altered data is called Derivative Image Data.

There are many well-known methods of creating Derivative Image Data ("DID") from Source Image Data ("SID"). Many of these methods consist of applying one or more transformations, $T(1), T(2), \ldots T(n)$ to the SID. These transformations may act on one or more SID sets and produce one or more DID sets. For example, if the SID is a digital image with an even number of pixels in each row and an even number of rows, $T(1)$ may be a transformation that "crops the source image to create a new image consisting of the upper right hand quarter of the source image". If the SID is a digital image where each pixel consists of three 8 bit numbers, R, B, G, that indicate the red, blue and green intensity values, respectively, for each pixel, $T(2)$ may be a transformation which "interchanges the R and B intensity values". A derivative image may be created from a source image by performing $T(1)$ and then $T(2)$ and then $T(1)$ on the SID. Other examples of image transformations are the rotation, scaling, filtering and image processing operations contained in Adobe's Photoshop software. Such methods are known as deterministically computable methods. Such methods generate a DID set from a specific set of SID sets by applying a specific set of completely defined transformations in a specific order. For example, if the SID set consisted of numbers and a transformation S was "multiply every other number by a random number generated by the local computer", then this method would not be deterministically computable unless the method of computing the random number was also specified and reproducible.

There are many standard and proprietary formats for image data. Some data formats do not contain information that describes how the data are to be interpreted. For example, consider a data set D consisting of 512×512×8 bits of data. This data set D may represent a gray scale image with 256 gray levels at each of the 512×512 pixel sites or the same data set D may represent balances in bank accounts. Other formats of data include meta-data (that is data about the data) that enables proper interpretation of the data. For example, there may be a header (another data set) which is appended to the header of D, which is text and reads "the data following this text consists of 512×512 bytes of data, each byte of which represents an 8 bit gray level pixel value and the pixels are arranged in an array of 512 rows and 512 columns of pixels with the first pixel value being located at the upper left-hand corner of the image and the subsequent pixels filling the array across rows and down columns." An alternative is to append a file name extension, such as .jpg, or .gif, which indicates that the data in the named file has a standard, well documented format either known to the public, or in the case of proprietary formats, to authorized users of the format. Many image formats use a combination of the file name extension and header data to provide interpretative information. For example, the jpg format includes a header structure and the header structure has a field in which users may insert data, such as a comment, which provides even more meta-data. Some fields of header data may be necessary for the format to conform to its specification and other fields may be optional.

When an application program is written, such as a program to display a .jpg image on a computer screen, the program may be written to ignore optional data in a header. An application program may still properly display the .jpg image, even if it does not use the optional data to display the image. Image data formats, which include header field(s) for data not required for use by an application program so it generates an image that conforms to the format specifications are termed herein as "commentable formats". The element of commentable formats that is important for the present invention is that it provides a mechanism for a program to insert and make use of reasonably large data strings without interfering with the proper interpretation of the formatted data by another, independent program which cannot parse or use the data strings. Although only image data is discussed herein, those skilled in the art will immediately understand that the appended header may be replaced by any mechanism which provides a documented place for meta-data and that such formats include formats for video and audio data, 3-dimensional data such as for CAT-scans, computer graphic data, virtual reality data and such other forms of data that have commentable formats.

There are many methods that relate to the use of source and derivative images. For example, the Open Prepress Interface ("OPI") specifies a mechanism for a user of a reduced size version (derivative) of a high quality original digital image (source) within compliant document creation programs to move the derivative around in the document (for example, for placement purposes) and then send the document, which includes a file pointer to the source image, to a printer. The printer then replaces the derivative image with the source image in the printed output. However, such methods do not include information as to how the derivative image was generated from the source image and the file pointer is not universal but specific to a particular file system.

There are many well known aspects to the management of digital data. One task may be to erase all digital data that has not been read or altered for a year and such tasks may be done efficiently. However, there are many valuable image management tasks which relate to the relationship of source and derivative images and that cannot now be done efficiently. For example, one of the most popular methods of generating images for the World Wide Web involves the use of Adobe's Photoshop program. Inside Photoshop, images are created in layers with, for example, one layer being a background photo (layer 1), another layer being an inset photo of a sports star (layer 2), another layer being a marketing brand icon (layer 3), another layer being a photo of a product (layer 4) and another layer being text (layer 5). A photo appearing on the Internet may consist of all layers superimposed on the previous one. One source-derivative data management task may be, for example, to replace all old brand icons appearing on such web images with new brand icons. Currently, except for looking (whether it is done by a person or by a computer image processing program) at every image on every web site (this approach is called the method of exhaustive search), there is no method for completing such a data management task. The method of exhaustive search, carried out by humans, is feasible only on small networks. However, there are not enough people to carry out an exhaustive search on the Internet within a time period that renders such a search useful to people and corporations. The method of exhaustive search, as carried out by computers, is only feasible when one imposes very restrictive conditions on the derivative data sets. For example, when brand images are arbitrarily rotated, scaled and filtered, even if such transformations are limited to those enabled by the Photoshop program only, no known computer program can identify such transformed brand images as being derived from source brand images.

What is needed is a system and method for identifying the source sets used to generate derivative images and the transformations used for generating such images.

SUMMARY

In general, the invention features a method and apparatus for processing derivative data sets generated by deterministically computable methods. The derivative data is managed in relationship to changes in source data or in relationship to new requirements for derivative data. For example, the derivative image data in a low resolution RGB JPEG format is appropriate for viewing on a computer monitor. If it becomes necessary to print the derivative data set on a different output device, the apparatus can generate a new, but similar, derivative data set from the source data that matches the resolution and color properties of the new output device.

In general, in one aspect, the invention features a data management system, including a process that contains a first data set, a first server associated with the process, the server including a processing engine, wherein the engine is adapted to process the first data set to form a second data set, a storage medium adapted to receive the second data set; and a second server adapted to distribute the second data set. The second server is not necessary for distribution of the second data set, this could certainly be one physical server. The entire system (repository, databases, transform engine & client applications) can be implemented on a single Windows PC.

In an implementation, the system includes a first database having at least one data structure associated with the first data set and a second database having at least one data structure associated with the second data set.

In another implementation, the system includes a data attachment associated with the second data set that identifies the second data set as a derivative of the first data set.

In still another implementation, the first and second data sets are images.

In another aspect, the invention features a method of managing data, including locating a first data set, transforming the first image into a second data set, while maintaining the first data set and processing the image for use on a network.

In an implementation, locating the first image includes searching for locating data associated with the first data set and retrieving the first data set based on the locating data.

In another implementation, transforming the first data set includes associating a tag with the second data set that identifies the second data set as a derivative of the first data set.

In another implementation, the tag is embedded in the second data set or attached to the second data set.

In another aspect, the invention features a data management method, including providing a first source data repository having at least one source data set, providing access to at least one user to the first source data repository, forming one additional data repository having a subset of source data from the first data repository, wherein the subset of data is provided from the user, receiving requests from the user in the additional data repository to form derived data sets from the subset of source data, selectively processing the requests and forming derived data sets in response to the requests.

In an implementation, selectively processing the requests includes determining whether the user is authorized to access the additional data repository, allowing the user access to the additional data repository if it is determined that the user has authorization and alternatively allowing the user to access the data repository.

In another implementation, the method includes determining whether source data in the data repository that corresponds to the subset of data can be accessed by the user.

In still another aspect, the invention features a repository or database containing original or source image data set(s), a processing engine capable of applying a sequence of one or more computationally deterministic transformations to one or more of the original data sets, producing a secondary or derivative image data set(s), a process whereby a GUID (globally-unique identifier) is produced and associated with each derivative image data set generated through the process, a "derivative data database" containing a record of each transformation sequence so that a pointer to the source image data set, and the sequence of transformations and all parameters describing each transformation are stored with the associated GUID, a process that, given only a GUID, can retrieve the transformation sequence stored in database and reinitiate process in order to exactly regenerate the associated derivative image data set originally produced in process, or given alternate parameters for any element of the transformation sequence originally used in process, can initiate process using a modified transformation sequence to produce a new derivative image data set.

In an implementation, the system maintains multiple revisions of original source image data sets so that the specific revision of the source image data used in a particular process is recorded in (each record of) the derivative data database, so that if given a GUID associated with a derivative data set is produced from an old revision of a source data set, the system can either reproduce the derivative data set exactly from the old revision of the source data set(s) or produce a new and unique derivative data set using the same sequence of transformations recorded in the derivative data database but starting with the now current source data set.

In another implementation, the system records additional data concerning the derivative data set(s) in the derivative data database such as but not limited to the intended usage for each derivative data set, an alternate or preferred source data set, combined with a corresponding transformation sequence for process, that could henceforth be used in place of the derivative data set associated with the GUID.

In another implementation, the source data set and the derivative data set is image data so that source data sets can be inserted into a process, or revised and reinserted into a process, as any common or custom image file format (JPEG, GIF, PNG, TIFF, Adobe Photoshop .PSD, Windows Bitmap, etc) and derivative image data sets can be exported to any common or custom image file format (JPEG, GIF, PNG, TIFF, Adobe Photoshop .PSD, Windows Bitmap, etc).

In still another implementation, multiple source image data sets can be combined through a sequence of transformations as in a process to produce a derivative image data set.

In another implementation, the system includes one or more networked computers so that each GUID generated by a process can be combined with the networked host name (i.e. the Internet domain name) of the computer that maintains the derived data database, and be associated with the derivative image data set as a "tag" and an independent networked computer, connected to a common internetwork, that obtains the derivative image data set(s) along with the associated GUID(s)+host name, can connect to the computer specified in system a and request information concerning the derivative data set, and request that replica or similar derivative data be produced by system and delivered over the internetwork.

In another implementation, all computers within the system can exchange operational data using any common network protocol such as HTTP over TCP/IP, or over a proprietary network protocol.

In yet another implementation, derivative image data sets, exported in standard image file formats, contain the data as an "embedded tag" that exists in the following form: <tag start><tag GUID><origin server name><tag end>, where:

<tag start> and <tag end> are a fixed sequence of octets that are unlikely to occur in an image <tag guid> has a defined format and is always the same number of octets <server name> usually exists as a "fully qualified Internet domain name"

The total size for the sequence of <tag guid> and <server name> is limited to a finite number of octets.

So that, the tag data:

a. Is unobtrusive to applications that are unaware of the embedded tag b. Is easily located and validated by applications seeking the tag data c. Can easily be embedded in any commentable image file format d. Can potentially be harmlessly appended to any image file format that does not normally allow for comments.

In another implementation, the data exists as a tag within an HTML or XML document which references the associated derivative image file in the form of a fully-qualified or relative URL (Universal Resource Locator).

In another implementation, a process searches through the contents of one or more standard web sites (most likely via HTTP), looking for standard image files. The process then examines each image that it finds looking for embedded tags, and records information concerning the location of each tagged derivative image in a database.

In another implementation, the system enables a user to determine the (Internet) location of each derivative image that was derived from a particular source data set. Such a system would enable an application to automatically and transparently update "all known" derivative images produced from old revisions of a recently updated source data set by way of a mechanism.

A system and method of the present invention uniquely identifies derivative images and determines their origin in a network environment such as the Internet. The invention generates a derivative image from the original source data and associates a "tag" with the new derivative image. The tag uniquely identifies the server that generated it, the source image it was derived from, and the tasks or transformations that were applied to the source image to generate the derivative. The tag typically does not contain a map of tasks that produced the derivative set, and points to a database record containing all relevant information that is needed to reproduce the derivative data set. These transformations, which include compression, scaling, indexing, and editing, take an image file in a variety of formats as an input and then provide as an output an optimally formatted, edited, enhanced version of the image.

The form of this tag logically resembles that of a URL, such as:

mbp://mediabin.iterated.com/
 1ad29bf8dd121f2f3cef2c34ef1b2b3d where the "mbp://" represents a hypothetical protocol—although HTTP or another standard Internet protocol may be used. Also, a specific protocol for accessing the derived image data need not be specified by the tag. The "mediabin.iterated.com/" represents the host or domain that generated the derivative image. The 16 bytes of hexadecimal data represent a universally unique identifier from which the specified host or domain controller determines or looks up the history of the image being managed in a database.

Although the preceding example represents static data embedded in a simple image file, the tag may represent the same sort of data in a different form that allows an object to be modified according to the requirements of the rendering device. The tag provides a pointer to the location of comprehensive information about the derivative image's origin.

A tag is preferably inserted into commentable derivative image data which includes pointers to the location of not only source data but to the location of the set of instructions by which the source data was transformed into the derivative data. When these addresses have the form of an Internet host name together with a GUID (global unique identifier), this method is transparent to applications operating on the data set and the local computer file system where the image and other data are stored. It is also possible that the tag data (source host name or domain name and GUID) is associated with the derivative image data set through methods other than embedding the tag in the derivative image file. For example, the tag can be included within an HTML or XML document that includes, or points to, the derivative image.

DETAILED DESCRIPTION

Data Management Overview

Figure 0:
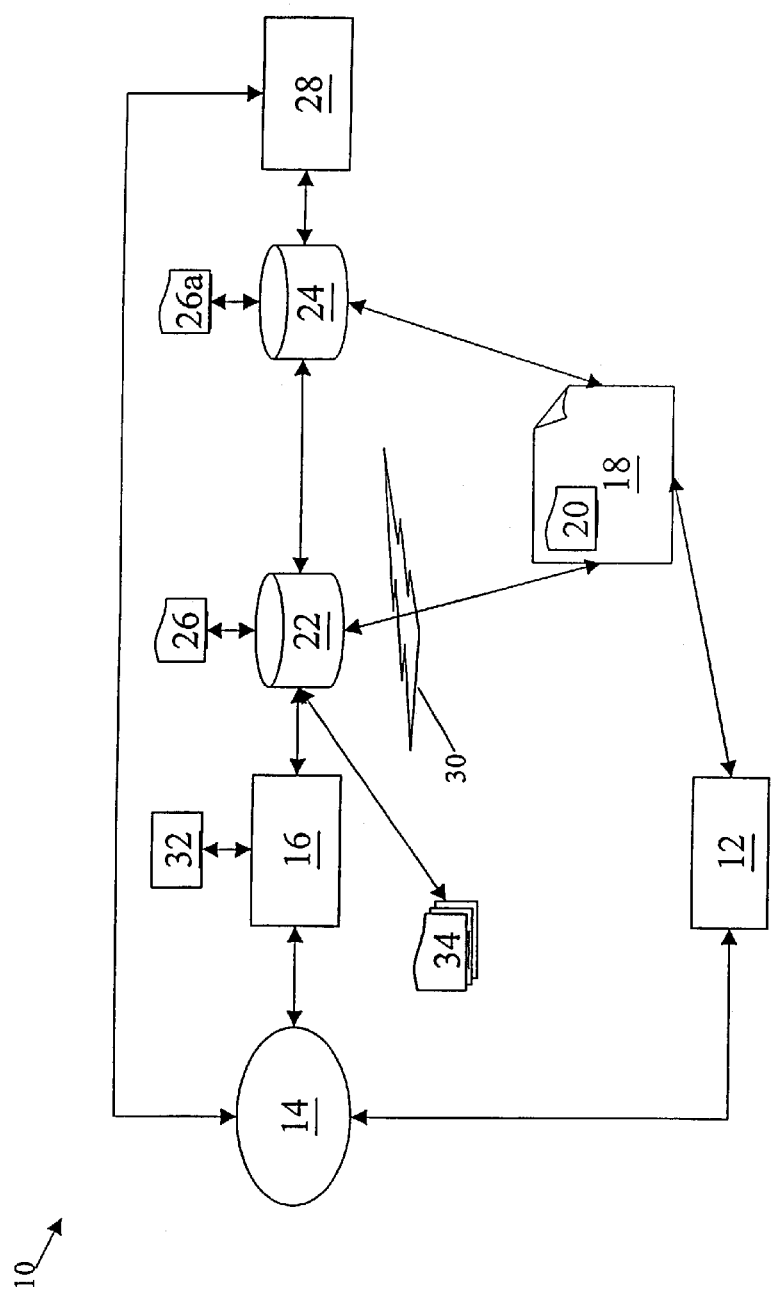
FIG. 0 illustrates an embodiment of a data management system.

FIG. 0 illustrates an embodiment of a data management system 10. A client computer 12 is connected to a server 16 through a network 14. The client 12 can download web pages from the server 16. The requests for the web pages and the web pages themselves are delivered through network 14. In this embodiment, a web page 18 residing on the client 12 is downloaded from the server 16 and can contain numerous pieces of information from data files such as image file 20. In some instances, the client 12 can be related to the server 16. For example, the server may be a corporate headquarters for a car manufacturer, and the client 12 may be a dealership. In such a situation, the client 12 may need access to one or more source files, such as file 20, of the web page 18. The file can be an image file, for example. The client 12 may want to access the file in order to edit it for a new application such as a print out for a flyer or for a software application to make the file 20 poster-size. If the file 20 was derived from an original source, then the file 20 is a derivative file. If the file 20 is an image file derived from a source image, then the image is a derivative image. As discussed above, the source image may have gone through several transformations to yield the derivative image.

Presently, if a client accesses a file, the file that is accessed is a web-ready file as described above. Such a file may have been modified from the original in such a way that when the file 20 is opened in an editor, much of the original information may have been lost. The information, such as resolution information, may have been lost due to any of the transformations that may have occurred to the file 20 such as compression or reduction.

In one embodiment, the client 12 is able to access a file 20 on the web page 18 for editing. However, if the client 12 desires to edit the file in some way, the client is able to access the original source file and not the derivative file. In some instances, the client 12 can access a source file 26 directly from the server's database 22. This access is possible if the server 16 had given prior authorization to the client 12 to access the database 22. However, the client 12 may not have been given this authorization and may encounter a firewall 30 when the client 12 tries to access the database 22. In this situation, the client can attempt to access a central database 24 that has a copy 26a of the source file 26. The central database 24 is connected to an application service provider 28. This application service provider 28 provides a process 32 to servers such as server 16 that allows access to source files so that original files can be edited for new derivative images, rather than using derivative images to make new derivative images, therefore losing information in preceding transformations. In some situations, the client 12 may not even be able to access the copy 26a of the source file 26 from the central database 24. In this situation, the client 12 has no access rights or authorization to the source file 26.

There are several other situations in which a client 12 may want to access the source file 26 instead of the derivative file 20. For example, if the derivative file 20 is an image, the client 12 may want to print the image to a printer. If the client prints the derivative image that is web-ready, the print out may be distorted because the image was not properly transformed to match the characteristics for a printer. Therefore, the client 12 can access either the server database 22 or the centralized database 24 for the source image and create a new derivative image (different from the derivative file 20) that is compatible with the printer.

The existence of a centralized application service provider 28 allows a central location for source images for several unrelated servers. This centralized location allows servers such as server 14 as well as related clients such as client 12 to remain as thin as possible. The centralized server 28 serves at least two basic functions. It initially provides the process 32 to the servers that desire to have the functionality of creating several derivative images 34 using a single source file 26. In this way a server such as server 16 can provide source image 26 access to one or more clients such as client 12, from database 22.

Another function of the centralized server is to provide centralized database 24 access to servers such as server 16. This centralized access to database 24 allows copies of source files to reside on the centralized database.

In an implementation, the owner of server 16 can contract with the owner of the server 28 and database 24 for the process 32 and for the service which provides access to the central database 24.

In another implementation, when the client successfully accesses a source file, an authentication process is also accessed which verifies that the source file is the authentic source file associated with the derivative image that the client 12 used to access the source file. This authentication can be accomplished by use of a tag that is associated with the derivative file. A detailed description of the tag is discussed below.

Data Management Operation

Figure 1:
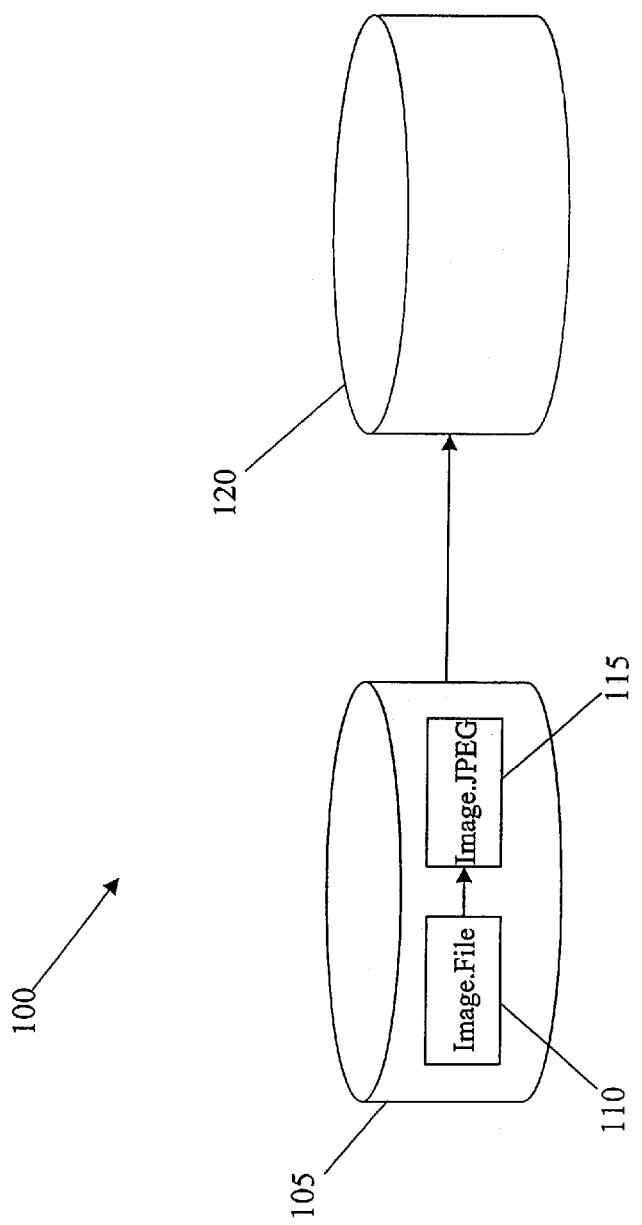
FIG. 1 illustrates an embodiment of an operational portion of a data management system of the present invention.

FIG. 1 illustrates an embodiment of an operational portion of a data management system 100. The system 100 is used to manage derivative image data that has been derived from source image data. A shared file system 105 can store numerous source images, each respectively associated with an image file 110. A process, which is described in detail below, can be used to transform the source image into one or more derivative images (for example an image JPEG associated with a file 115) that are "web-ready". The derivative image file 115 can then be transferred to a web server 120 where it is made available to a user (not shown). The web server 120 can be a part of any network server, Local Area Network (LAN) and the like.

Figure 2:
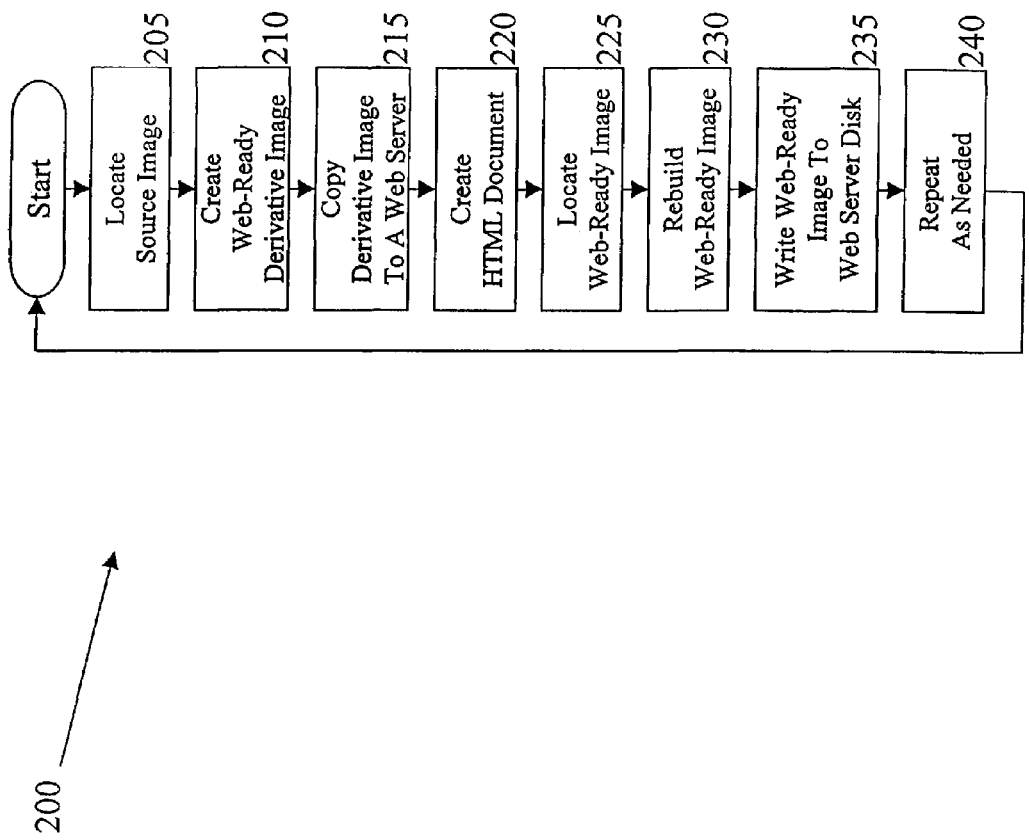
FIG. 2 illustrates a flow chart of an implementation of generation and placement of derivative images.

FIG. 2 illustrates a flow chart of an implementation of derivative image generation and placement process 200. The user or automatic process locates 205 a source image (that can be of any image format (e.g., .JPG, .GIF, .TRG, .BMP and the like)). The system then creates 210 a web-ready derivative of the source image. Typically the derivative is of any image format (such as .JPG) in which an embedded tag can be added to the format. In one embodiment, this embedded tag enables the process 200 to locate the source image and recreate a similar web-ready derivative from the original source image at a future time.

The derivative image is copied 215 to a web server (e.g., web server 120 in FIG. 1) and a standard HyperText Markup Language (HTML) document that references the web-ready image using a standard image tag is created 220. In an implementation, a standard HTML format is used, typically like the following:

[std_web_page.html]

<p> This html page was authored using a standard HTML editor. </p> <img src="Image.JPEG" width="240" height="190"></p>

The image tag can specify dimensions that are different from the physical pixel dimensions of the web-ready image.

The HTML is then examined to locate 225 the web-ready image containing the embedded tag. The process 200 then rebuilds 230 a new web-ready image from the source image based on the parameters of the standard HTML image tag. Finally, the process 200 writes 235 the newly created web-ready image to a storage location on a web server (typically overwriting the original derivative image whose physical dimensions did not match the dimensions specified by the image tag). This process may be repeated 240 as necessary.

FIGS. 1 and 2 describe the basic approach of the hardware and software involved with derivative image management. The following figures illustrate further specific embodiments of derivative image management.

Figure 3:
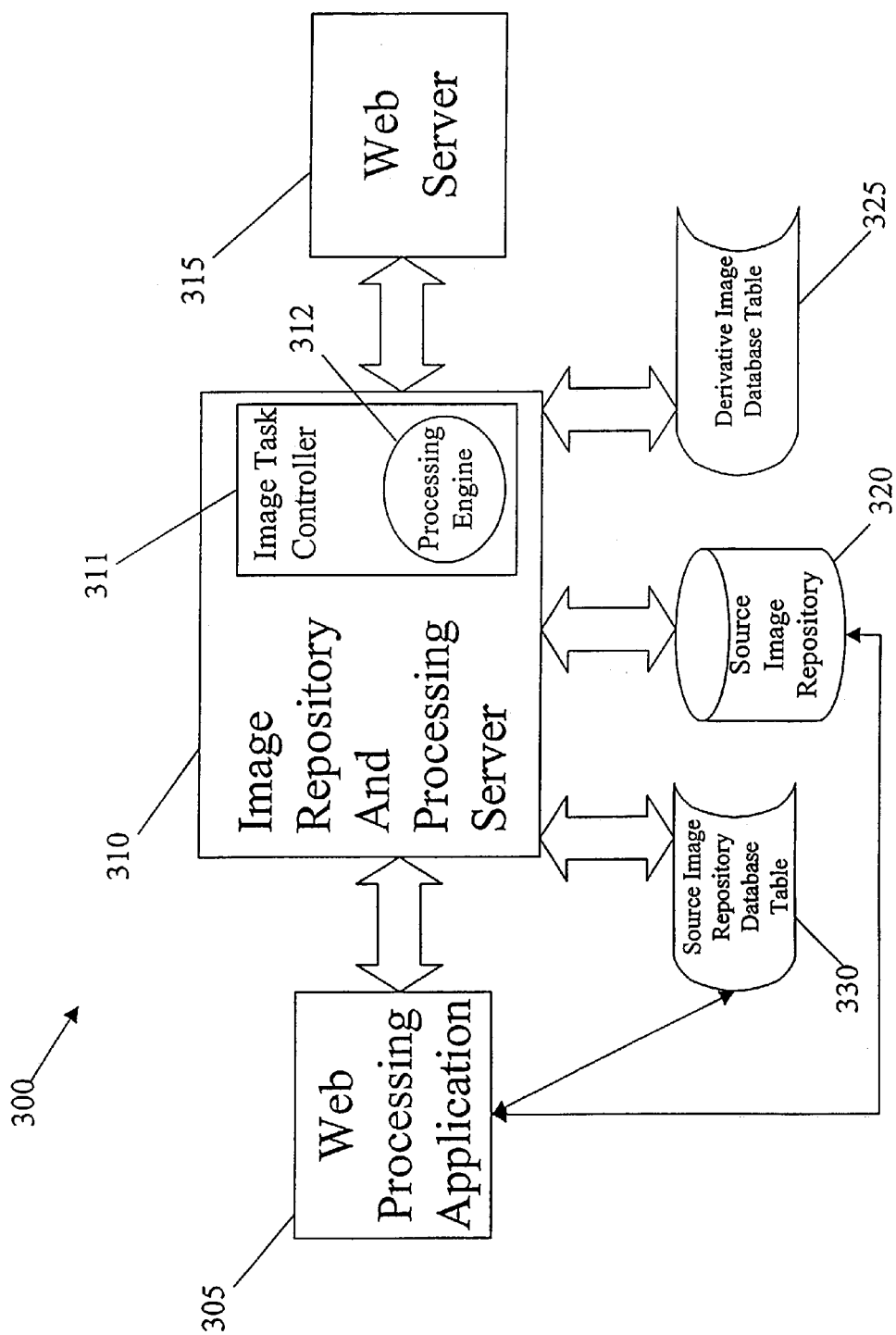
FIG. 3 illustrates another embodiment of a data management system.

FIG. 3 illustrates another embodiment of a data management system 300. Any web processing application 305 is connected to an image repository and processing server 310. The server 310 includes an image task controller 311 and processing engine 312. The image task controller 311 and processing engine 312 work in conjunction to process the source images to create new derivative images. The image repository and processing server 310 is connected to a web server 315 that is typically the ultimate location for the derivative image to be distributed. The web processing application 305 is typically connected to a source image repository database table 330 that locates source images for use in the application 305 from the source image repository 320 that is also connected to the image repository and processing server 310. A derivative image database table 325 is connected to the image repository and processing server 310 and stores the derivative image metadata. Although not shown, the derivative image database table can also be connected to the web processing application 305.

Figure 4:
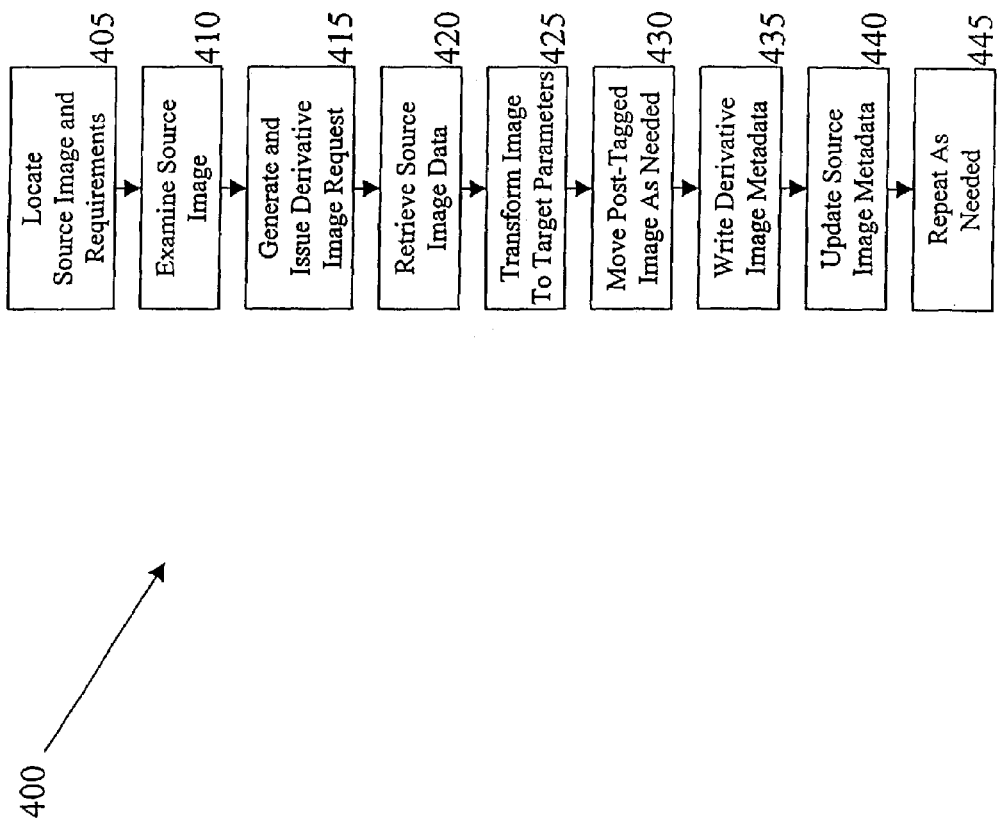
FIG. 4 illustrates a flow chart of an implementation of derivative image creation and placement.

The data management system 300 can contain a process for derivative image creation and placement. FIG. 4 illustrates a flow chart of an implementation of a derivative image creation and placement process 400. The system 300 first examines the website and the web page to locate 405 and identify a source image location and the associated requirements of that image. Requirements typically are the needed characteristics of a derivative image, for example, file format, pixel dimensions, color space and the like. Next the image is examined 410 to select desired image elements and layers, such as a crop region. The source location is typically determined from the source image repository database table 330 and retrieved from the source image repository 320 (as discussed below). The process generates and issues 415 a derivative image request to the image repository and processing server 310. Typically the image request contains several elements such as, but not limited to: a source image ID, required derivative image attributes (image elements, color space, crop region, scale factor, file format and the like) and the derivative image destination (Universal Resource Locator (URL) for HTTP post, file name and location, and the like).

The source image is then retrieved 420 from the source image repository 320. Typically, the image data is the form of pixel data. The image is transformed 425 to the requested derivative image parameters. In addition, the unique tag is applied and the derivative image is created. Next the post-tagged image is moved 430 as needed, typically to the web server 315. As mentioned above the format is a URL and updated HTML. The derivative metadata is written 435 to the derivative image database table 325. Optionally, the source image metadata is updated 440 to indicate that a derivative image has been produced and written back to the source image repository database table 330. The derivative image database record contains a reference to the source image and the source image version. A report detailing which images have been derived from a given source image can be generated. This process can be repeated 445 as necessary.

Figure 5:
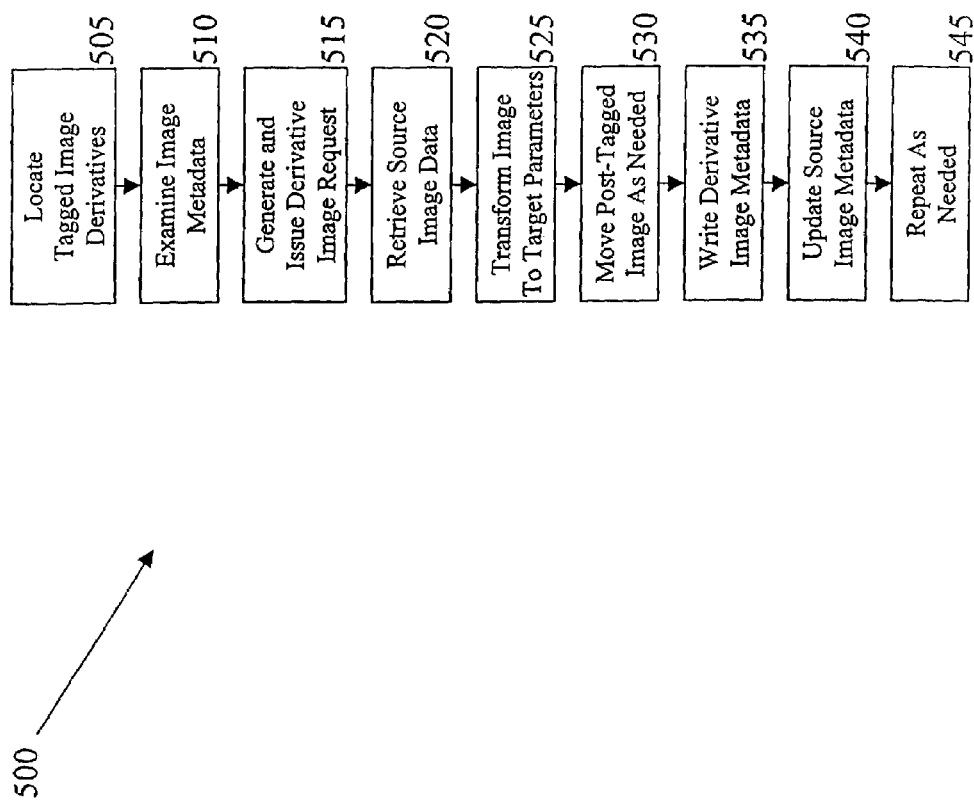
FIG. 5 illustrates a flow chart of an implementation of global derivative image updating.

The system 300 can also be used in a global derivative image updating process. FIG. 5 illustrates a flow chart of an implementation of a global derivative image updating process 500. This process 500 is typically used to update derivative images that already have been tagged. The process first locates 505 tagged derivative images, which can be located on the web server 315. The derivative image metadata within the derivative image database is examined 510 to determine if derivatives were created from current source image versions. Derivative image requests can then generated and issued 515 to update. The requests typically contain, but are not limited to the following elements: target image attributes (e.g., update derivatives) and target image destinations (URLs for HTTP Post, filenames and locations and the like). The source image data is then retrieved 520 from the source image repository 320. The image is then transformed 525 to new derivative image parameters, unique tags are applied and the image derivatives are created. The post-tagged images are moved 530 typically to URLs on the web server 315. The derivative image metadata is written 535 to the derivative image database table 325 and the source image metadata is updated 540 in the source image repository database table 330. The user can repeat 545 the process 500 as needed.

Figure 6:
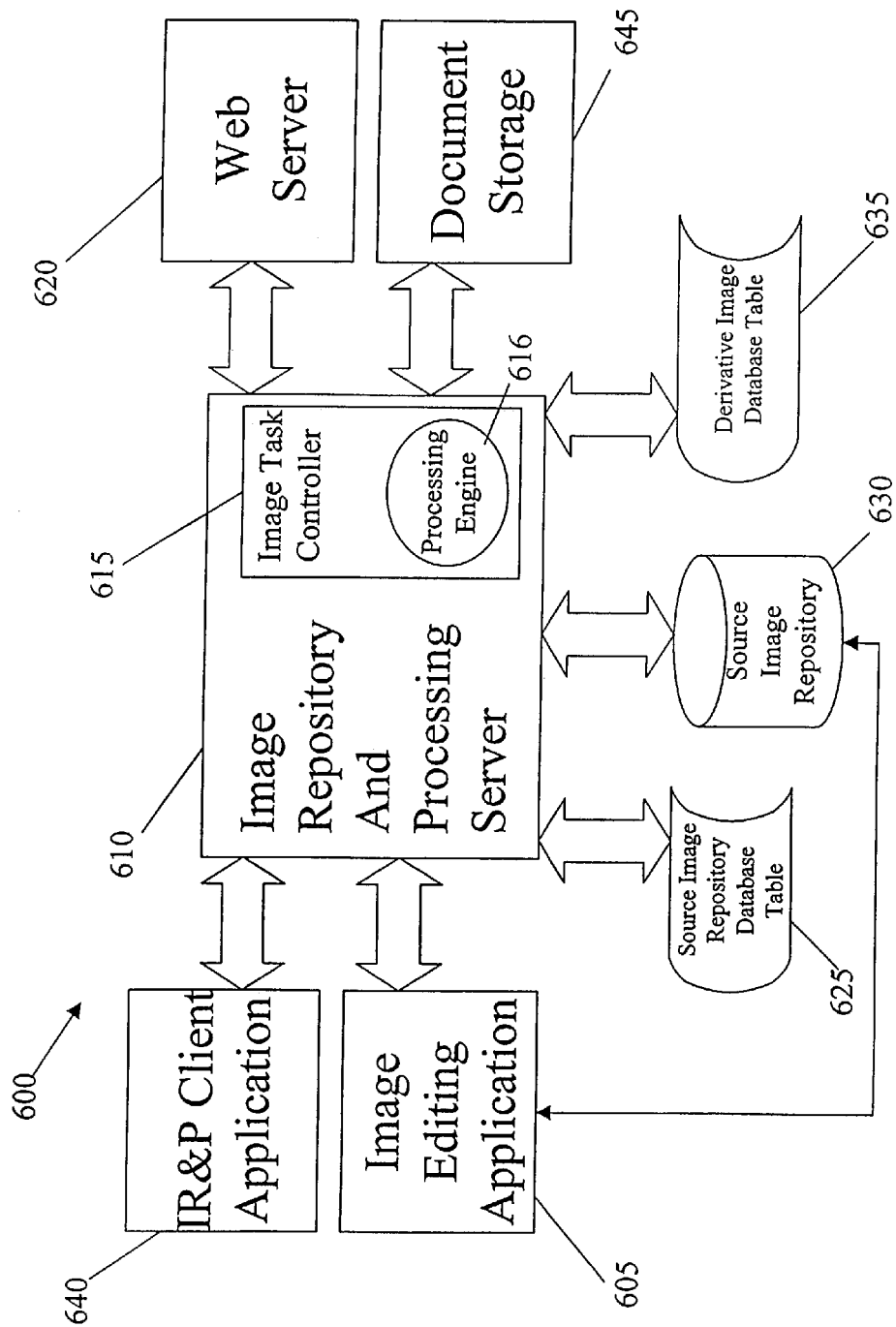
FIG. 6 illustrates another embodiment of a data management system.

FIG. 6 illustrates still another embodiment of a data management system 600. This system 600 can be used with other derivative image management processes (discussed below). An image editing application 605 is associated-with an image repository and processing server 610. The image repository and processing server includes an image task controller 615 and processing engine 616 used to process the images. Also associated with the image repository and processing server 610 is an image repository and processing client application 640, which typically handles additional commands. A web server 620 is connected to the image repository and processing server 610. A document storage unit 645 is typically a file server storage containing compound files containing tagged derivative image files. A source repository database table 625 and source image repository 630 are connected to the image repository and processing server 610. A derivative image database table 635 is also connected to the image repository and processing server.

Figure 7:
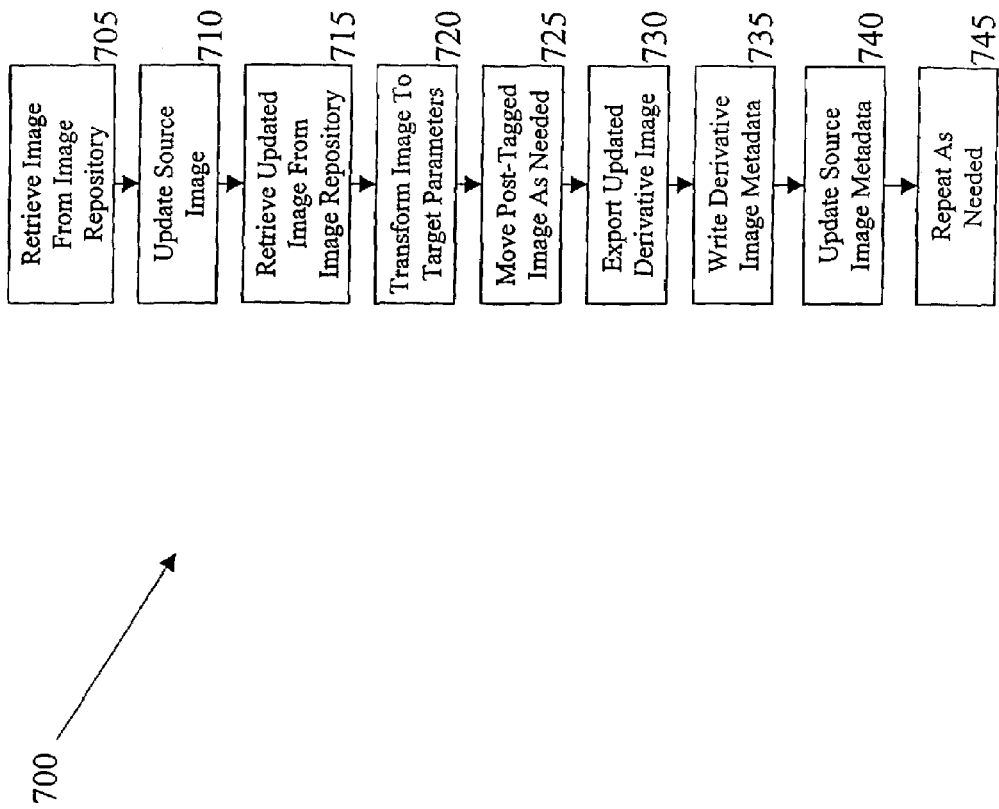
FIG. 7 illustrates a flow chart of an implementation of source and derivative image updating.

The system 600 can be used to update both source and derivative images. FIG. 7 illustrates a flow chart of an implementation of a source and derivative image updating process 700. First the process 700 browses the source image repository 630 and retrieves 705 the image from the repository 630. The source image is updated 710 and checked back into the repository 630 creating a new version. The updated source image is located in the repository 630, typically by the image repository and processing client 640. The client 640 then issues an "update known derivatives" command and retrieves 715 the updated image from the repository 630. The image is transformed 720 to target parameters, wherein unique tags are applied and the derivative image is created. The post-tagged image is moved 725 to the URLs (as discussed above). The updated derivatives are exported 730 to external compound files stored in the document storage unit 645. The derivative image metadata is written 735 to the derivative image database table 635. Finally, the source image metadata is updated 740. This process 700 can be repeated 745 as needed.

In general, the systems and methods described above provide for applications that can transparently manage image resolution and color characteristics across numerous applications running on machines connected to a common network (such as the Internet or private intranet). For example, a plug-in, or "COM add-in" for Microsoft® Office can provide Office applications with a mechanism to connect to, browse and search a data management system server for a desirable source image, define an optional sequence of transformations and parameters (crop region, layer selections, resolution, color, filters, target file format and the like) into a document. Each placed image object is identified with a tag that identifies the data management server or entity that produced the image, and a GUID.

The originating data management server, when presented with a derivative image GUID by a client application, can offer comprehensive information about the derivative image, including but not limited to: source image GUID; secondary, tertiary ... source image GUID(s); source image revision(s) used to produce DI; source image current revision(s); retrieval Task GUID (if applicable); retrieval Task contents (all transform steps with parameters); derivative image saved to location; derivative image creation server name (for example, server's Internet Domain Name); derivative image creator (name of user that issues request for DI); derivative image creation date and time; derivative image comment or intention; and alternate derivative image GUID record (i.e. this GUID is obsolete, recommend this GUID).

The client application can also make requests for and receive new image data, to retrieve a duplicate derivative image, an updated derivative image from more recent revisions of source image(s), or to render a similar derivative image for an arbitrary output device.

Figure 8:
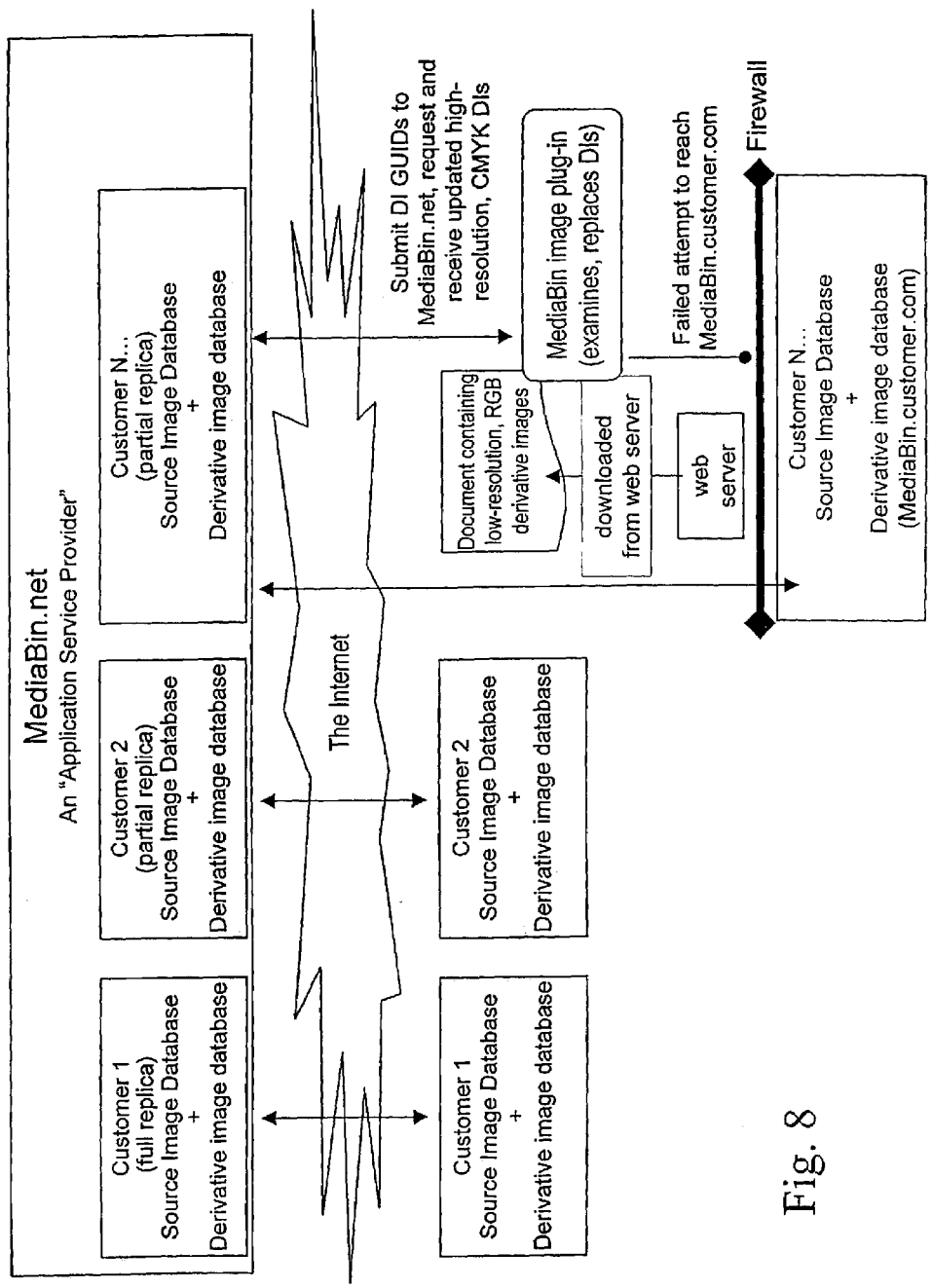
FIG. 8 illustrates an overview of an embodiment of a business model.

In another embodiment, as shown generally in FIG. 8, one technique allows an offer to the data management system's software licensees enabling them to establish a relationship with an ASP that provides hosting for "replica" data management system data and services. The ASP-hosted replica can contain both the data management system repository (source image database: image and metadata) and DID contents. The service also offers the option of maintaining DID records at a well-known host address such as: master-.mediabin.net. Because each derivative image GUID is indeed "globally unique", a query to master.mediabin.net can resolve any derivative image GUID that has been replicated to an ASP that is associated with mediabin.net, and has been flagged to publish a "GAR" (Globally Accessible Reference) at master.mediabin.net.

Such a service can enable any number of applications, such as a COM add-in for Microsoft Office, a plug-in for Adobe Acrobat, or a stand-alone application, if having failed in an attempt to contact the host name identified by the derivative image tag, to contact master.mediabin.net with the derivative image GUID in question. If a globally accessible reference exists for the GUID in question, and the requesting user passes authentication requirements, then the ASP's data management system server can fulfill requests for related image data.

Customers may indicate that modified or updated derivative image data can be requested from master.mediabin.net by anonymous users, or they may require that users supply a digital signature or username and password. These access requirements can be determined globally or on an image-by-image basis.

This business model presumes that customers obtain a software license for a local data management system server, and subscribe to the hosted service. A partial list of how a customer may be charged for this service can include, but is not limited to, the following: local data management system software license fee; monthly or quarterly fee per megabyte of data maintained for them at a data management system site; and monthly or quarterly fee per image transaction.

As an example of the methods and systems described above, a comparison of a prior art system to create a derivative image from a source image and of the data management system used to create a derivative image from a source image is shown. This example illustrates the value of being able to regenerate an image from an original source, rather than generating a new image from a derivative of the original source image, which may not include information necessary for the creation of the new derivative image.

As a category of web content, images represent a special challenge. Unlike data from conventional databases, application source code, promotional text, XML and HTML, web images cannot be directly edited and reused. The vast majority of images used on web sites are generated to meet specific size and format requirements from an original source image of another format—typically an Adobe Photoshop document that was worked with during the creative process.

Figure 9A:
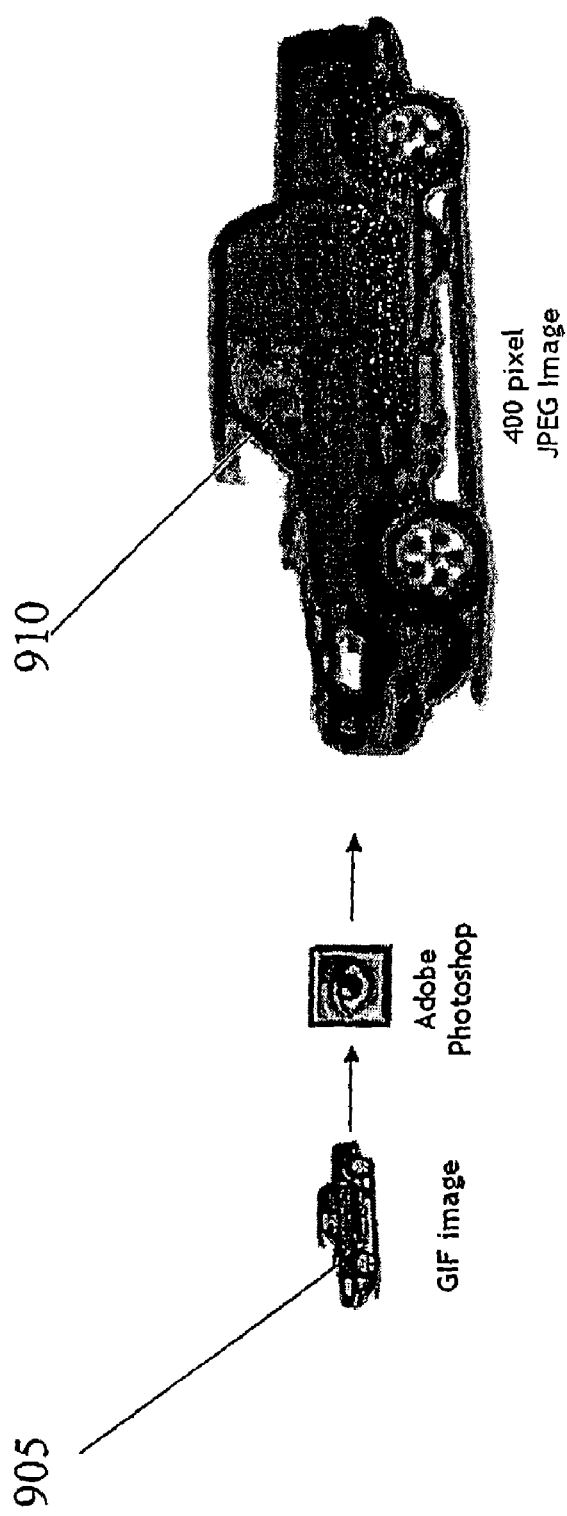
FIG. 9A illustrates a prior art attempt to modify an image.

FIG. 9A illustrates a prior art attempt to modify an image. Presently, it is very difficult to produce a 16 million-color, 400 pixel-wide JPEG image starting with a 64 color, 100 pixel-wide GIF image (from a web page) using Photoshop. An original GIF image 905 is modified in Adobe® Photoshop to produce the resulting image 910.

Figure 9B:
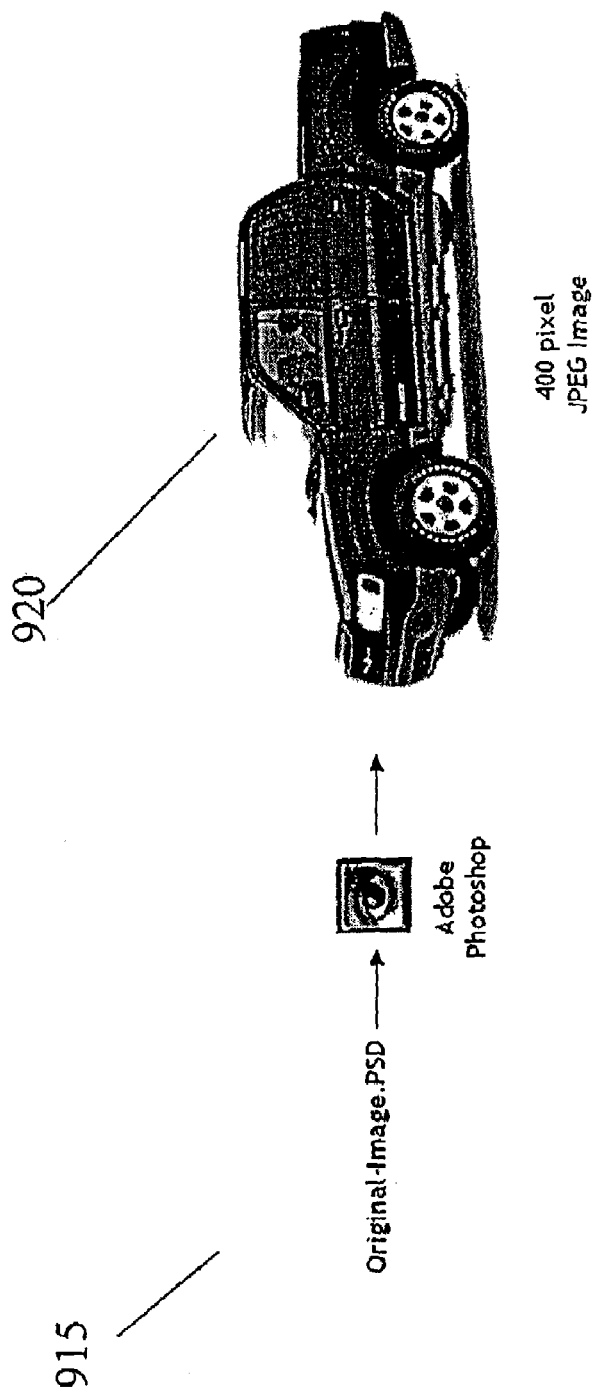
FIG. 9B illustrates an implementation of modifying an image using the data management system.

FIG. 9B illustrates an implementation of modifying an image using the data management system of the present invention. A derivative image 920 is produced from a source image 915 using the methods and system described above.

In view of the foregoing detailed description of preferred embodiments of the present invention, it readily will be understood by those persons skilled in the art that the present invention is susceptible to broad utility and application. While various aspects have been described in the context of HTML and web page uses and in the context of management of image data, the aspects may be useful in other contexts as well. Many embodiments and adaptations of the present invention other than those herein described, as well as many variations, modifications, and equivalent arrangements, will be apparent from or reasonably suggested by the present invention and the foregoing description thereof, without departing from the substance or scope of the present invention. Furthermore, any sequence(s) and/or temporal order of steps of various processes described and claimed herein are those considered to be the best mode contemplated for carrying out the present invention. It should also be understood that, although steps of various processes may be shown and described as being in a preferred sequence or temporal order, the steps of any such processes are not limited to being carried out in any particular sequence or order, absent a specific indication of such to achieve a particular intended result. In most cases, the steps of such processes may be carried out in various different sequences and orders, while still falling within the scope of the present inventions. In addition, some steps may be carried out simultaneously. Accordingly, while the present invention has been described herein in detail in relation to preferred embodiments, it is to be understood that this disclosure is only illustrative and exemplary of the present invention and is made merely for purposes of providing a full and enabling disclosure of the invention. The foregoing disclosure is not intended nor is to be construed to limit the present invention or otherwise to exclude any such other embodiments, adaptations, variations, modifications and equivalent arrangements, the present invention being limited only by the claims appended hereto and the equivalents thereof.

What is claimed is:

1. A data management system, comprising:
   a source image data (SID) database containing at least one source image data (SID) set;
   a processing engine adapted perform a first process to apply a sequence of one or more computationally deterministic transformations to the SID set to produce at least one derivative image data (DID) set, to generate an identifier associated with the produced DID set, and to embed the associated identifier within each produced DID set;
   a derivative image data (DID) database containing a record of the sequence of transformations for each DID set and all parameters describing each of the transformations;
   wherein the embedded identifier comprises means for locating the stored SID set at the DID database and means for retrieving the sequence of transformations and all the parameters describing each of the transformations from the DID database; and
   a second process adapted to use the embedded identifier to retrieve the SID set and the transformation sequence stored in the DID database and reinitiate the first process to generate additional DID for the DID set;
   wherein the SID set used in the reinitiated process comprises any of the original SID set and at least one alternate version of the original SID set; and
   wherein each of the one or more computationally deterministic transformations used in the transformation sequence applied to the SID set in the reinitiated process comprises any of the corresponding original computationally deterministic transformations and at least one alternate version of the corresponding original computationally deterministic transformations.

2. The system of claim 1 wherein the second process comprises an instruction to direct the first process to regenerate the DID set originally produced in the first process and associated with each of the SID sets.

3. The system of claim 1 wherein the second process comprises an instruction to initiate the first process using a modified transformation sequence to produce a new image data set, wherein the second process uses alternate parameters for any element of the transformation sequence originally used in the first process.

4. The system of claim 1 wherein the SID database maintains multiple revisions of each of the SID sets, wherein the specific revision of each of the SID sets used in the first process is recorded in the DID database.

5. The system of claim 4 wherein the second process is adapted to reproduce the DID set exactly from the old revision of one of the SID sets, using the embedded identifier.

6. The system of claim 4 wherein the second process is adapted to produce a new and unique DID set using the same sequence of transformations recorded in the DID database applied to a new current SID set.

7. The system of claim 1 wherein the DID database is adapted to record additional data concerning the SID sets.

8. The system of claim 7 wherein the additional data is the intended usage of the DID sets.

9. The system of claim 7 wherein the additional data is an alternate SID set combined with a corresponding transformation sequence for the first process that can be adapted to be used in place of the DID set associated with the identifier generated by the first process.

10. The system of claim 1 wherein the SID set is adapted to be, inserted into a common image file format and the DID set can be exported to the common image file format.

11. The system of claim 1 further comprising:
    at least one networked computer wherein each embedded identifier is adapted to be combined with a name associated with the networked computer to generate a tag associated with each of the DID sets; and
    an independent networked computer, connected to a common network, that obtains the DID sets along with the associated tags and can communicate with each of the networked computers and request information concerning the DID sets, and request that a replica DID set be produced and delivered over the network.

12. The system of claim 11 wherein each of the DID sets, exported in common image file formats, contain the tag embedded in the DID set.

13. The system of claim 11 whereby the tag exists within a document which references the associated DID set in the form of a universal resource locator (URL).

14. The system of claim 11 further comprising a process having instructions to:
    search through the contents of one or more standard web sites looking for standard image files;
    examine each image that it finds looking for embedded tags; and
    record information concerning the location of each tagged derivative image in a database.

15. The system of claim 1 adapted to determine the location of each DID set that was derived from a particular SID set, wherein all associated derivative images of the corresponding DID set produced from old revisions of a recently updated SID set are automatically and transparently generated and stored in the DID database.

16. A data management system, comprising:
    a process that contains a source image data (SID) set;
    a first server associated with the process, the server including a processing engine, wherein the engine is adapted to process the SID set to form a derivative image data (DID) set, to generate an identifier associated with the formed DID set, and to embed the associated identifier within each formed DID set;
    a storage medium adapted to receive the DID set;
    a second server adapted to distribute the DID set;

a first database having at least one data structure associated with the SID set; and a second database having at least one data structure associated with the DID set and having data that identifies the second data set as a derivative of the SID set wherein the identifier embedded within the formed DID set comprises means for locating the at least one data structure associated with the SID set, and means for retrieving the process through which the SID set formed the DID set.

17. A method for managing data, comprising:

providing a source image data (SID) repository having SID sets;

providing access to at least one user to the SID repository;

forming one additional data repository having a subset of the SID sets from the SID repository, wherein the subset of the SID sets is provided from the user;

receiving requests from the user in the additional data repository to form derivative image data (DID) sets from the subset of the SID sets;

selectively processing the requests; and forming DID sets in response to the requests, comprising the steps of:

applying a sequence of one or more computationally deterministic transformations to each of the requested SID sets to form each DID set;

generating identifiers each uniquely associated with each formed DID set: and embedding each of the associated identifiers with their corresponding formed DID set;

wherein each of the embedded identifiers comprises means for locating the requested SID set that corresponds to the corresponding formed DID set, and means for locating the sequence of computationally deterministic transformations applied to the requested SID set that corresponds to the corresponding formed DID set.

18. The method of claim 17 wherein selectively processing the requests comprises:

determining whether the user is authorized to access the additional data repository;

allowing the user access to the additional data repository if it is determined that the user has authorization; and alternatively allowing the user to access the data repository.

19. The method of claim 17 further comprising:

determining whether the SID set in the data repository that corresponds to the subset of the SID set can be accessed by the user.

* * * * *